(12) United States Patent
Okajima et al.

(10) Patent No.: US 8,051,607 B2
(45) Date of Patent: Nov. 8, 2011

(54) WEATHER STRIP AND MANUFACTURING METHOD THEREOF

(75) Inventors: Kurato Okajima, Aichi-ken (JP); Kenji Kobayashi, Aichi-ken (JP); Mitsuhiro Takahara, Aichi-ken (JP); Masanori Aritake, Aichi-ken (JP)

(73) Assignee: Toyoda Gosei Co., Ltd., Aichi-Ken (JP)

( * ) Notice: Subject to any disclaimer, the term of this patent is extended or adjusted under 35 U.S.C. 154(b) by 702 days.

(21) Appl. No.: 11/593,073

(22) Filed: Nov. 6, 2006

(65) Prior Publication Data

US 2007/0101657 A1     May 10, 2007

(30) Foreign Application Priority Data

Nov. 9, 2005   (JP) ................ P-2005-324810
Jun. 29, 2006   (JP) ................ P-2006-179627
Jun. 29, 2006   (JP) ................ P-2006-179628

(51) Int. Cl.
    *E06B 7/16*       (2006.01)
(52) U.S. Cl. ...................... 49/490.1; 49/498.1
(58) Field of Classification Search ............ 49/475.1, 49/490.1, 498.1
See application file for complete search history.

(56) References Cited

U.S. PATENT DOCUMENTS

| | | | | |
|---|---|---|---|---|
| 2,718,207 A | * | 9/1955 | Garrison | 118/309 |
| 3,404,487 A | * | 10/1968 | Johnson | 49/475.1 |
| 4,164,599 A | * | 8/1979 | Kessler | 428/92 |
| 4,201,813 A | * | 5/1980 | Brumlik | 428/97 |
| 4,352,845 A | * | 10/1982 | Miska | 428/88 |
| 4,390,387 A | * | 6/1983 | Mahn | 428/90 |
| 4,699,818 A | * | 10/1987 | Evans et al. | 428/85 |
| 5,143,772 A | * | 9/1992 | Iwasa | 428/122 |
| 5,151,307 A | * | 9/1992 | Jackson | 428/31 |
| 5,354,594 A | * | 10/1994 | Naito et al. | 428/122 |
| 5,529,650 A | * | 6/1996 | Bowers et al. | 156/64 |
| 5,688,356 A | * | 11/1997 | Sagiv | 156/331.7 |
| 5,753,063 A | | 5/1998 | Sakakibara et al. | |

(Continued)

FOREIGN PATENT DOCUMENTS

CN       2691916 Y      4/2005

(Continued)

OTHER PUBLICATIONS

Definition of "TEX", downloaded from http://www.search.com/reference/Units_of_textile_measurement#Tex. (definition provided in office action, p. 2-3.*

(Continued)

*Primary Examiner* — Jerry Redman
(74) *Attorney, Agent, or Firm* — McGinn IP Law Group, PLLC

(57) ABSTRACT

A weather strip is mounted on a circumferential portion of a door opening for a vehicle door. The weather strip includes a trim portion having a substantially U-shaped cross section and a hollow seal portion, and a designed lip is formed on the trim portion so as to extend therefrom. An adhesive layer and a flocked portion are formed on a designed surface of the weather strip such as an external surface of the designed lip, the flocked portion being provided with a multiplicity of pile fibers which are bonded to the adhesive layer at one end thereof, which pile fibers are each angled randomly with respect to a normal direction to the external surface of the lip portion.

11 Claims, 4 Drawing Sheets

U.S. PATENT DOCUMENTS

| | | | |
|---|---|---|---|
| 6,110,546 A | 8/2000 | Honda et al. | |
| 6,279,987 B1* | 8/2001 | Keeney et al. | 296/146.9 |
| 6,682,822 B2* | 1/2004 | Cretekos et al. | 428/447 |
| 7,261,483 B2* | 8/2007 | Gueret | 401/126 |
| 7,478,863 B2* | 1/2009 | Krause | 296/146.2 |
| 2001/0033927 A1 | 10/2001 | Omori et al. | |
| 2002/0064646 A1* | 5/2002 | Cretekos et al. | 428/331 |
| 2003/0134971 A1* | 7/2003 | Blount | 524/589 |
| 2003/0152779 A1* | 8/2003 | Kondo et al. | 428/424.2 |
| 2003/0157338 A1* | 8/2003 | Kondo et al. | 428/423.3 |
| 2004/0010093 A1* | 1/2004 | Wefringhaus et al. | 525/418 |
| 2004/0092640 A1* | 5/2004 | Makino et al. | 524/425 |
| 2008/0188609 A1* | 8/2008 | Agarwal et al. | 524/504 |

FOREIGN PATENT DOCUMENTS

| | | |
|---|---|---|
| DE | 38 05 931 A1 | 9/1989 |
| DE | 697 24 092 T2 | 7/1998 |
| EP | 0329964 | 1/1989 |
| EP | 0855303 | 11/1997 |
| JP | 54-79613 | 6/1979 |
| JP | 62-6012 (U) | 1/1987 |
| JP | 62297375 A * | 12/1987 |
| JP | 64-42956 | 3/1989 |
| JP | 03-086531 | 4/1991 |
| JP | 2000-289463 A | 10/2000 |
| JP | 2002-205606 | 7/2002 |
| JP | 2006306943 A * | 11/2006 |

OTHER PUBLICATIONS

Definition of "TEX", downloaded from http://www.search.com/reference/Units_of_textile_measruement#Tex., dated Jan. 2000.*
Chinese Office Action dated Dec. 19, 2009 with English-Language Translation.
German Office Action dated Jun. 1, 2007 with English translation.
Japanese Office Action dated Jun. 15, 2010 with English translation thereof.
Japanese Office action issued May 17, 2011 with an English-language translation thereof.

* cited by examiner

WEATHER STRIP AND MANUFACTURING METHOD THEREOF

BACKGROUND OF THE INVENTION

1. Field of the Invention

The present invention relates to a weather strip and a method for manufacturing the weather strip. More specifically, the invention relates to a flocked weather strip and a method for manufacturing the same weather strip.

2. Related Art

In general, a weather strip is provided along a peripheral portion of a door of a vehicle such as an automobile or a circumferential portion of a door opening of a vehicle body. As an example of a weather strip, there is known, for example, a weather strip which includes a trim portion having a substantially U-shaped cross section which is mounted on the peripheral portion of the door or a flange formed along the circumferential portion of the door opening and a hollow seal portion which is provided so as to protrude from the trim portion. Then, when the door is closed, the seal portion is brought into press contact with the circumferential portion of the door opening or the peripheral portion of the door so as to establish a seal between the door and the vehicle body.

In recent years, since the same external appearance quality as that of an interior decorative component such as a fabric is also demanded for an external surface of a weather strip, that is, a portion of the weather strip such as a designed surface or a seal surface thereof which becomes visible such that the weather strip is mounted accordingly, there exists a weather strip in which a fabric is attached to an external surface of the weather strip so as to realize an increase in the design properties thereof (refer to, for example, Japanese Patent Publication NO. JP-B-6-104343). When attaching the fabric to the weather strip, however, normally, in order to prevent the fabric from interrupting the deformation of the seal portion when the door is closed, an adhesive is applied to the external surface of the seal portion, so that the external surface of the seal portion is prevented from adhering to the fabric.

In a case where the external surface of the seal portion is prevented from adhering to the fabric, however, when the weather strip is mounted on the circumferential portion of the door opening or the like, the fabric does not follow the deformation of the seal portion in a corner or the like, and there may be caused a risk that wrinkles are produced in the fabric.

On the contrary, in case the external surface of the seal portion is made to adhere to the fabric, since the seal portion is made difficult to be deformed, there is caused a fear that the sealing properties are reduced.

Further more, there have been developed weather strips in which an increase in their design properties is realized by flocking is applied to the designed surface of the trim portion (refer to, for example, Japanese Utility Model Publication No. JP-54-79613U).

In the related art, however, since flocking is applied to the trim portion which constitutes a substrate (or a base material) so that pile fibers adhere almost vertically to the trim portion by an electrostatic flock machining, only a uniform appearance is provided. And the uniform appearance looks artificial, no natural feeling such as the fabric and a textile etc. being able to be felt. In addition, although flocking has been proposed which provides an irregular effect on the surface of the trim portion, it has still been difficult to produce the natural feeling in the fabric or the textile.

SUMMARY OF THE INVENTION

The invention was made with a view to solving the problems, and an object thereof is to provide a weather strip which can increase an external appearance quality at the flocked portion while maintaining original functions such as the sealing properties of the seal portion, and a method for manufacturing such a weather strip.

Hereinafter, aspects of the invention for solving the problems will be described.

The first aspect of the invention provides a weather strip comprising:

a trim portion having a U-shaped cross section adapted to be mounted to one of peripheral portion of a vehicle door and a flange along a circumferential portion of a door opening of a vehicle body;

a seal portion protruded from the trim portion to be brought into contact with a mating member when the vehicle door is closed;

a flocked portion is adhered with an adhesive layer on a predetermined area of an external surface of the weather strip, wherein the flocked portion is provided with a multiplicity of pile fibers bonded to the adhesive layer to form piles so as to be angled randomly with respect to a normal direction to the external surface of the weather strip.

According to the first aspect of the invention, an irregularity effect is provided on the surface of the flocked portion by the pile fibers applied so as to be oriented in various random directions, thereby making it possible to present a natural feeling. As a result, an increase in the external appearance quality at the flocked portion can be realized.

In addition, if the flocked portion is provided on the trim portion in particular, since the trim portion which constitutes a substrate, or a base material, is covered with the pile fibers which are angled randomly with respect to the normal direction, being different from the related art in which pile fibers are applied substantially vertically to the substrate by electrostatic flocking machining, even in the event that the external surface of the trim portion is seen from the normal direction, an effect is increased to conceal the cooler of the substrate. As a result, even in the event that the substrate presents a black color due to the material including a carbon black, the black color can be concealed.

In the weather strip according to the invention, the adhesive layer may be colored when formed.

According to this construction, even in the event that the trim portion and the lip portion present the black color due to the carbon black, the black color can be concealed. As a result, also from the viewpoint of tinge, the increase in external appearance quality at the flocked portion can be realized. Note that the adhesive layer may be colored in black to match it to decorative components inside the passenger compartment.

In the weather strip according to the invention, the flocked portion may be formed by flocking colored pile fibers.

According to this construction, by using the colored pile fibers, for example, a tinge can be provided which approximates to a fabric which matches an interior component or the like in the passenger compartment, thereby making it possible to realize an increase in the external appearance quality. Further, the black color of the trim portion and the lip portion can be concealed, thereby making it possible to realize the increase in the external appearance quality at the flocked portion. In addition, in particular, in a case where colored pile fibers are used, along with the fact that the trim portion which constitutes the substrate is covered with the pile fibers which are angled variously with respect to the normal direction as has been described above, the effect to conceal the color of the substrate can be made explicit, thereby a defect that the color of the colored pile fibers is reduced or offset being suppressed by the sufficient concealment of the color of the substrate.

In addition, as with the adhesive layer, the flocked portion may be colored in black to match it to the decorative components inside the passenger compartment. Additionally, when the colored pile fibers are used for the flocked portion on the assumption that the adhesive layer is colored, this aspect of the invention may be understood to state "wherein the adhesive layer and the flocked portion are colored in the same color or colors of the same color system". By adapting this configuration, a difference in color between the adhesive layer and the flocked portion is reduced, thereby making it possible to increase the concealment of the color of the substrate.

In the weather strip according to the invention, the adhesive layer may be formed of an adhesive which is based on a water-based urethane.

According to this constitution, the pile fibers can be bonded to the weather strip which is made of a rubber material more strongly and rigidly by the adhesive which is based on the water-based urethane. Furthermore, since the adhesive emits no volatile organic compound (VOC) such as formaldehyde, the adhesive is friendly to the environment.

Another aspect of the invention provides a weather strip manufacturing method for manufacturing a weather strip, including:

an extrusion step of extruding a main body portion of the weather strip;

a surface treatment application step of applying a surface treatment to an external surface of the main body portion;

an adhesive application step of applying an adhesive to the external surface of the main body portion to which the surface treatment has been applied; and a flocking step of flocking a portion of the main body portion where the adhesive is applied with pile fibers using an electrostatic spray gun.

According to this construction, the formation of the adhesive layer is facilitated by applying the surface treatment to the external surface of the main body portion of the weather strip.

In the weather strip according to the invention, the flocked portion may be adhered on the external surface of the seal portion.

According to this construction, a fabric-like external appearance can be obtained and a high design property can be obtained with respect to the seal portion. Being different from a case where an actual fabric is attached to the external surface of the seal portion, since no wrinkle is produced in a corner portion or the like when the weather strip is mounted, the reduction in external appearance quality is suppressed. Furthermore, since the seal portion can be deformed without difficulty when the door is closed or the like, the reduction in sealing properties is also suppressed. As a result, an increase in the external appearance quality of the weather strip can be realized while maintaining the sealing performance of the seal portion. Note that the "external surface of the seal portion" means a portion of the surface of the seal portion which becomes visible such that the weather strip is mounted and aims to exclude invisible portions such as a portion which faces a trim portion which constitutes a mounting proximal portion and a portion which is covered by an interior component or the like. Of course, there will be caused no problem even in the event that a flocked portion is formed on the portions which become invisible, and with a view to realizing an increase in design properties, the flocked portion only has to be formed on at least the portion (the external surface) of the seal portion which becomes visible.

In the weather strip according to the invention, the pile fibers may be bent into a curve.

In a case where (straight) pile fibers which are formed into a straight-line shape are sprayed to become vertical to the surface of the seal portion, even in the event that not only inexpensive transparent pile fibers but also colored pile fibers are sprayed densely, the surface of the seal portion which constitutes a substrate becomes visible, and there may be caused a risk that the appearance of the weather strip is deteriorated. In addition, since rubber materials which are used as materials for weather strips generally contain carbon black as a reinforcement material, it is difficult to color a weather strip in a desired color, and there may be caused a risk that the aforesaid problem becomes explicit. Consequently, with the pile fibers which are formed into a straight-line shape, the texture tends to look different depending on an angle at which the weather strip is looked at, and it becomes extremely difficult to obtain a fabric-like external appearance.

On the contrary to this, with the (bent) pile fibers sprayed which are bent into a curve, since the pile fibers get entangled with each other and the pile fibers lie on the surface of the seal portion, an effect to conceal the surface of the seal portion is enhanced, and a more fabric-like texture can be obtained.

In the weather strip according to the invention, the multiplicity of pile fibers may be sprayed to lie in random directions.

According to this construction, even in case straight pile fibers are used, the same function and advantage as those obtained by the above aspects of the invention can be obtained. In addition, by a synergetic effect with using the bent pile fibers, the function and effect can be enhanced. When forming the flocked portion on the external surface of the seal portion, an adhesive layer is formed on the external surface of the seal portion and thereafter, the pile fibers are sprayed to stick to the external surface of the adhesive layer (or to be fixed thereto at one end of the pile fibers). In this case, the "random directions in which the pile fibers are sprayed to lie" means directions in which the pile fibers pierce the adhesive layer at one end thereof, that is, directions in which fixed ends of the pile fibers are directed. Due to this, the external surface of the seal portion looks like fabric by virtue of entanglement of the pile fibers, and even when the seal portion is deformed, the entangled pile fibers are not extended to such an extent that the entanglement between the fibers becomes so coarse to allow the black color of the substrate to become visible. On the contrary, in case pile fibers which are each formed into a straight shape and an electrostatic flocking is adapted, the pile fibers are sprayed to lie erect, and hence, the flocked portion does not look like fabric. In addition, when the seal portion is deformed, the straight pile fibers which lie erect are caused to separate from each other to such an extent that coarse portions are produced, resulting in a risk that the black color of the substrate becomes visible through the coarse portions so produced. In addition, as the spraying method for spraying a multiplicity of pile fibers to be directed randomly, methods car be raised in which pile fibers are sprayed using a pressurized spray gun or electrostatic spray gun.

In the weather strip according to the invention, an adhesive for adhesion of the pile fibers may have an extensibility of 100% or larger after it has set.

According to this construction, since the adhesive is flexible, the adhesive can follow the deformation of the seal portion, thereby making it possible to suppress a reduction in sealing properties. Note that although it will be described in detail later on, the "extensibility after the adhesive has set" means an extensibility at normal temperatures which results when the adhesive is made into a film.

In the weather strip according to the invention, the adhesive which is based on the water-based urethane resin may contain a carbodiimide hardening agent or an epoxy hardening agent.

According to this construction, an increase in wear resistance can be realized.

In the weather strip according to the invention, the seal portion may be formed of an elastic sponge material.

In the invention, it is preferable that weather strip the flocked portion is provided with a multiplicity of pile fibers having a length of 0.6 mm or longer and 1.0 mm or shorter and a thickness of 2.2 T dtex or thicker and 6.7 T or thinner is formed on at least an external surface of the seal portion.

By using the aforesaid pile fibers which are relatively shorter and relatively thicker than conventional pile fibers (which are used in a general static flocking) as pile fibers which provide the flocked portion, the pile fibers are made difficult to be collapsed when the seal portion is brought into press contact with the circumferential portion of the door opening as the door is closed, and the collapsed pile fibers are made easy to be restored to their original state as the door is opened. As a result, the contact mark is made difficult to remain at the portion which has constituted the sealing surface when the door is opened. Moreover, the reduction in external appearance quality can be suppressed which would otherwise be caused due to the contact mark being made to look shining brighter than the other portions by light reflected by the collapsed pile fibers.

Note that the "external surface of the seal portion" means a portion on the surface of the seal portion which becomes visible such that the weather strip is mounted accordingly and aims to exclude invisible portions such as a portion which faces a trim portion which constitutes a mounting proximal portion and a portion which is covered by an interior component or the like. Of course, there will be caused no problem even in the event that a flocked portion is formed on the portions which become invisible, and with a view to realizing an increase in design properties, the flocked portion only has to be formed on at least the portion (the external surface) of the seal portion which becomes visible.

In addition, in order to make the contact mark produced when the door is closed more invisible, the length of the pile fiber is preferably in the range of 0.6 mm or longer and 0.8 mm or shorter, and the thickness thereof is preferably 3.3 T or thicker. However, with a pile fiber whose length is shorter than 0.6 mm, as will be described later on, when a pile fiber is used which is bent into a curve, the intended curve or bent becomes difficult to be produced, and hence the pile fiber becomes straight. Therefore, it is not preferable to use pile fibers whose length is shorter than 0.6 mm. In addition, with a pile fiber which is thicker than 6.7 T, it becomes difficult to obtain a fabric-like external appearance, which is, hence, not preferable.

In the weather strip according to the invention, wherein the multiplicity of pile fibers are provided with pile fibers of two or more different colors which includes at least white.

According to this construction, since the whole of the flocked portion is colored in a mixed color which contains white, even in case a contact mark is produced on the seal portion, whereby the collapsed pile fibers reflect light, a difference between the contact mark and the other portions is made difficult to be visible and the contact mark is made difficult to be explicit. As a result, the reduction in external appearance quality can be suppressed.

In the weather strip according to the invention, the pile fibers may be bent into a curve.

In case (straight) pile fibers which are formed into a straight shape are sprayed to lie vertical relative the surface of the seal portion, there is caused a risk that the problems become more remarkable which are described as being inherent in the related art. In contrast to this, in a case where curved (or bent) pile fibers are sprayed, since the pile fibers so sprayed get entangled with each other or lie obliquely with respect to the surface of the seal portion, the same function and advantage as those provided by Means 2 are provided. Note that with a pile fiber whose length is shorter than 0.6 mm, since an intended curve becomes difficult to be produced, it is preferable to use a pile fiber whose length is 0.6 mm or longer. In addition, with a pile fiber whose length is longer than 1.0 mm, pile fibers get entangled with each other within a nozzle of a spray, and the nozzle tends to get clogged easily, whereby a uniform spraying of the pile fibers gets difficult, and therefore, the usage of pile fibers whose length is longer than 1.0 mm is not preferable.

In the weather strip according to the invention, the multiplicity of pile fibers may be sprayed to lie in random directions.

According to this construction, even in case straight pile fibers are used, the same function and advantage as those obtained by the other aspects of the invention can be obtained. In addition, the function and effect can be enhanced. When forming the flocked portion on the external surface of the seal portion, an adhesive layer is formed on the external surface of the seal portion and thereafter, the pile fibers are sprayed to stick to the external surface of the adhesive layer (or to be fixed thereto at one end of the pile fibers). In this case, the "random directions in which the pile fibers are sprayed to lie" means directions in which the pile fibers pierce the adhesive layer at one end thereof, that is, directions in which fixed ends of the pile fibers are directed. Due to this, the external surface of the seal portion looks like fabric by virtue of entanglement of the pile fibers, and even when the seal portion is deformed, the entangled pile fibers are not extended to such an extent that the entanglement between the fibers becomes so coarse to allow the black color of the substrate to become visible. On the contrary, in case pile fibers which are each formed into a straight shape and an electrostatic flocking is adapted, the pile fibers are sprayed to lie erect, and hence, the flocked portion does not look like fabric. In addition, when the seal portion is deformed, the straight pile fibers which lie erect are caused to separate from each other to such an extent that coarse portions are produced, resulting in a risk that the black color of the substrate becomes visible through the coarse portions so produced. In addition, as the spraying method for spraying a multiplicity of pile fibers to be directed randomly, methods car be raised in which pile fibers are sprayed using a pressurized spray gun or electrostatic spray gun.

DETAILED DESCRIPTION OF THE PREFERRED EMBODIMENTS

First Embodiment

Figure 1:
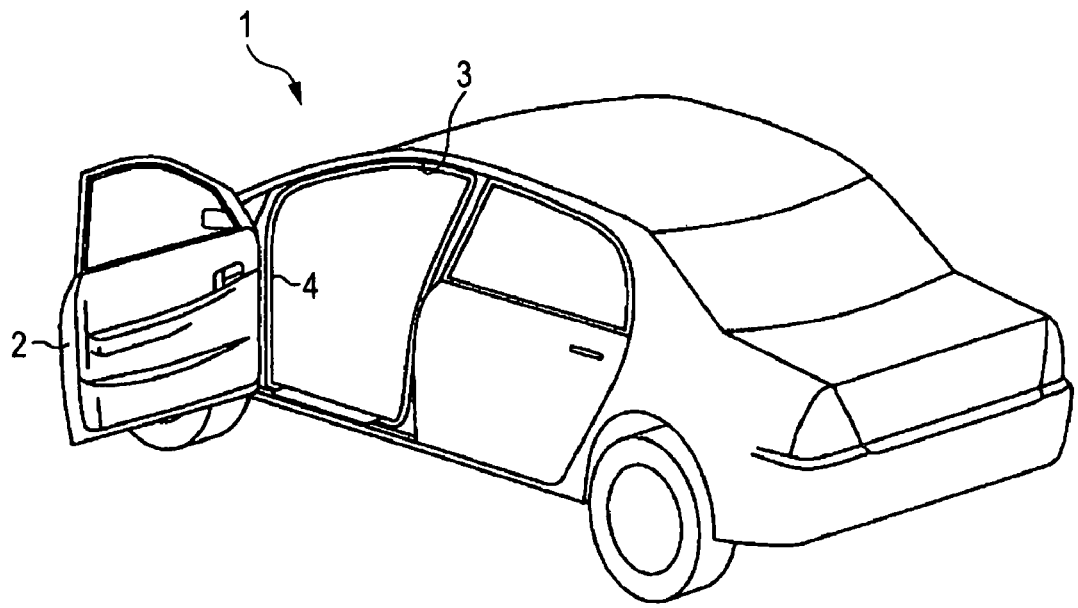
FIG. 1 is a perspective view showing an automobile.

Hereinafter, a first embodiment of the invention will be described by reference to the accompanying drawings. As shown in FIG. 1, a door 2 is provided so as to be opened and closed on a side of an automobile 1 as a vehicle, and a weather strip 4 is mounted along a circumferential portion of a door opening 3 which is formed in a portion of a vehicle body corresponding to the door 2. The weather strip 4 of this embodiment is formed mainly by extrusion and is formed into an annular shape as a whole.

Figure 2:
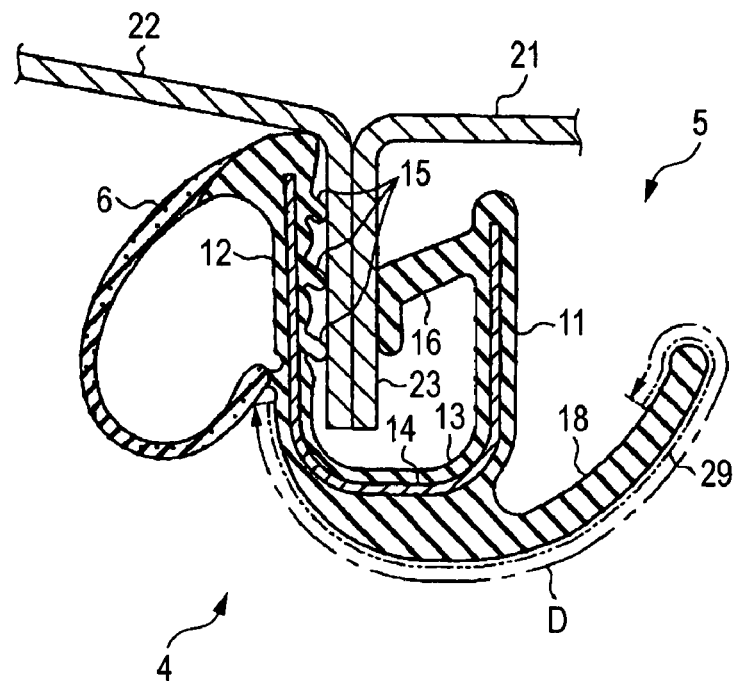
FIG. 2 is a sectional view showing a weather strip according to first embodiment of the invention.

As shown in FIG. 2, the weather strip 4 includes a trim portion 5 and a seal portion 6. The trim portion 5 includes an interior side wall portion 11, an exterior side wall portion 12 and a connecting portion 13 which connects together both the wall portions 11, 12 and is, hence, formed to have a substantially U-shaped cross section as a whole. The trim portion 5 is made of an EPDM (ethylene-propylene-diene terpolymer) solid rubber, and a metal insert 14 is embedded in an interior thereof. Note that in this embodiment, an EPDM rubber is adapted to make the weather strip 4. This EPDM rubber contains a carbon black as a reinforcement material, and the color of a substrate thereof is black.

A plurality of holding lips 15 are integrally formed on an inner surface (a surface facing the inside of the vehicle) of the exterior side wall portion 12 so as to extend toward the inside of the trim portion 5 (toward the inside of the vehicle), while a holding lip 16 is integrally formed on an inner surface (a surface facing the outside of the vehicle) of the interior side wall portion 11 so as to extend toward the inside of the trim portion 5 (toward the outside of the vehicle). A designed lip 18 is formed on the connecting portion 13 on a side of the seal portion 6 which faces an inner periphery of the door opening 3 so as to extend therefrom to cover an interior component such as a garnish, not shown. The designed lip 18 corresponds to the lip portion of the invention. Note that the trim portion may be formed to have a substantially L-shaped cross section by the exterior side wall portion and the connecting portion which constitutes a bottom wall. In this case, no insert may be embedded in the interior thereof. Furthermore, a configuration may be adapted in which no holding lip is formed, so that the trim portion is securely attached to a flange by means of a pressure sensitive adhesive double coated tape.

In addition, a flange 23 is formed along a circumferential portion of the door opening 3 as a result of an inner panel 21 and an outer panel 22 of the vehicle body being joined together, and the trim portion 5 is fitted on this flange 23 so formed, whereby the weather strip 4 is held on the circumferential portion of the door opening 3.

On the other hand, the seal portion 6 is provided integrally on an exterior side of the exterior side wall portion 12 so as to protrude therefrom and is formed of an EPDM sponge rubber as an elastic sponge material into a hollow configuration. Then, the seal portion 6 is brought into press contact with a peripheral portion of the door 2 when the door 2 is closed, so as to establish a seal between the door 2 and the vehicle body of the automobile 1.

Figure 4:
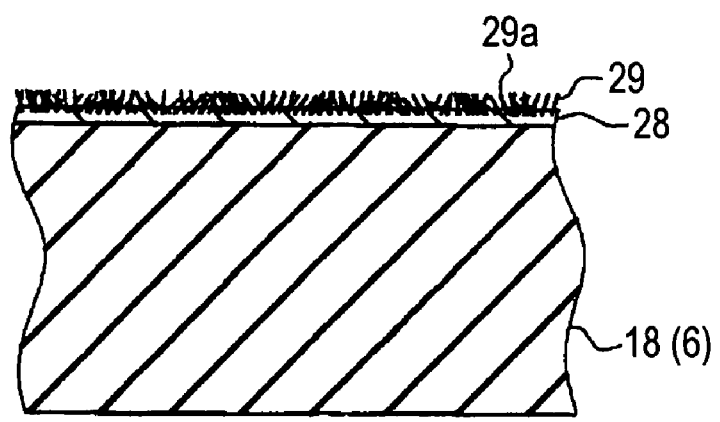
FIG. 4 is a partially enlarged sectional view which explains an adhesive layer and a flocked portion.

A designed surface D which is exposed as an external appearance of the weather strip 4 is formed over an external surface thereof which expands from almost a distal end portion to a proximal end portion of the designed lip 18 and reaches across the connecting portion 13 of the trim portion 5 to a portion of the exterior side wall portion 12 where the seal portion 6 is continuously connected to the exterior side wall portion 12 such that the weather strip 4 is mounted. As shown in a partially enlarged sectional view in FIG. 4, an adhesive layer 28 is formed on the designed surface D, and a flocked portion 29 is formed on the adhesive layer 28. Note that the designed surface D includes a folded back portion.

As an adhesive which provides the adhesive layer 28, an adhesive which is based on a water-based urethane is used, and the adhesive is colored in beige and becomes opaque due to a coloring agent being mixed thereinto. A color in which the adhesive layer is colored is not, of course, limited to beige and any color (as long as it is other than black which results from carbon black, for example, red, blue, gray, brown (dark brown) and the like) may be used which matches the color of an interior component such as a garnish. Note that in a case where an interior component or the like which lies within the passenger compartment is a black-based color, there may exist a case where a black pigment is added for adjustment to match the adhesive layer 28 to the interior component or the like in the passenger compartment in terms of color and gloss.

The flocked portion 29 of this embodiment is formed by spraying a multiplicity of pile fibers 29a over the adhesive layer 28 using an electrostatic spray gun, and the pile fibers 29a are bonded to the adhesive layer 28 at one end thereof and are each angled randomly (variously) with respect to a normal direction to the designed surface D. Note that in this embodiment, as the pile fibers 29a, a polyamide fiber is used which has a length of about 0.5 mm to 0.8 mm and a thickness of 1.5 deniers to 3 deniers. In addition, the pile fibers 29a are colored in beige which constitutes the same color as that of the adhesive layer 28. A color in which the pile fibers 29a are colored is not, of course, limited to beige, and hence, the pile fibers 29a may be colored in any color which matches an interior component such as a garnish or the like, as with the adhesive layer 28.

Figure 5:
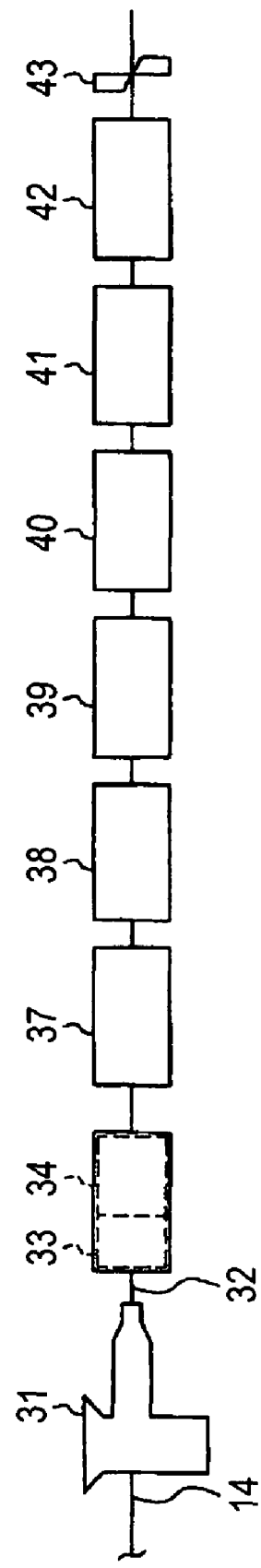
FIG. 5 is an exemplary diagram showing part of a manufacturing line for the weather strip.

Next, a manufacturing method of the weather strip 4 will be described. FIG. 5 is an exemplary diagram showing part of a manufacturing line for weather strips 4, and in the figure, a weather strip 4 is manufactured as it is traveling from the left to the right.

Figure 3:
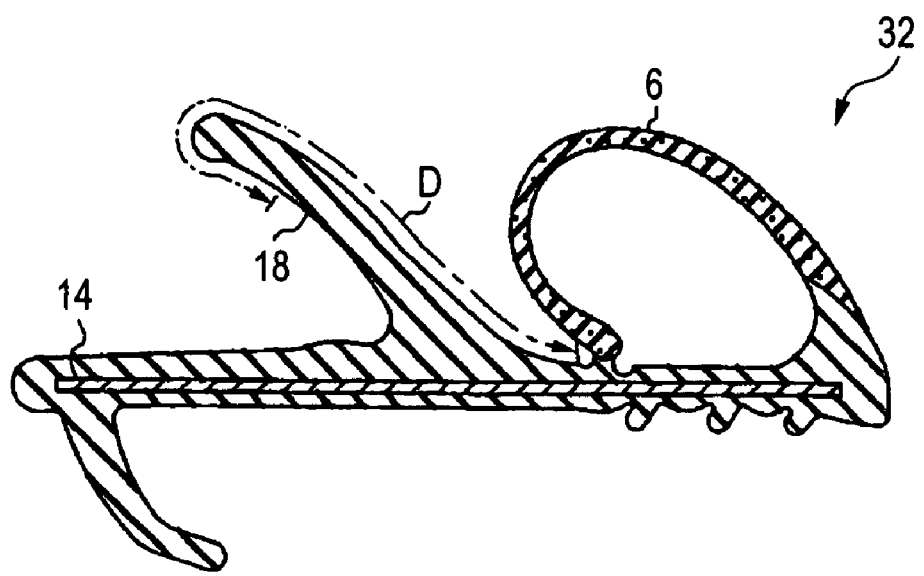
FIG. 3 is a sectional view showing an intermediate extruded material of the weather strip.

Firstly, in an extrusion step, an insert 14 is continuously supplied together with an unvulcanized EPDM rubber into a rubber extruder 31. Then, an intermediate extruded material 32 (refer to FIG. 3) which provides a main body portion of a weather strip 4 is extruded from a die of the rubber extruder 31 such that the insert 14 is covered with the unvulcanized EPDM rubber. In this stage, the intermediate extruded material 32 is extruded into a substantially flat plate-like shape such that an insert 14 embedded location corresponding to the trim portion 5 is opened flat as shown in FIG. 3.

In a vulcanizing step which follows the extrusion step, the intermediate extruded material 32 which has been so extruded is guided into a high frequency vulcanizing tank (UHF) 33 for a primary vulcanization. Thereafter, the intermediate extruded material 32 is guided into a hot air vulcanizing tank (HAV) 34 for a secondary vulcanization, where the vulcanization of the intermediate extruded material 32 is completed.

In a surface treatment application step which follows the vulcanization step, a surface treatment is applied to the intermediate extruded material 32 by a surface treatment application apparatus 37 so as to facilitate the formation of an adhesive layer 28, which will be described later on. As the surface treatment, a plasma treatment, a corona discharge treatment, a primer application and the like in which polarity is provided are raised.

Thereafter, in an adhesive application step, an adhesive is applied to a surface of the intermediate extruded material 32 by means of an adhesive applicator 38, so as to form an adhesive layer 38.

In the following flocking step, firstly, in a flocking apparatus 39, a multiplicity of pile fibers 29a are sprayed to the portion where the adhesive is applied using a pressurized spray gun. The pressurized spray gun sends the pile fibers 29a as deep as an interior portion of a fiber application booth under a predetermined air pressure and to spray the pile fibers 29a out from an outlet to the portion where the adhesive is applied under a predetermined air pressure. As this occurs, the pile fibers 29a which are so sprayed are caused to lie on the adhesive layer 28 while being oriented in various directions. Then, the adhesive so applied is heated to be set in a dryer 40 so that the pile fibers 29a are fixed in place in such a manner as not to be dislodged therefrom. Thereafter, extra pile fibers 29a are blown off from the adhesive layer 28 in a blower 41. The flocked portion 29 is completed after passing through the steps that have been described above.

Alternatively, in the flocking step the pile fibers 29a can be sprayed to the intermediate extruded material 32 using an electrostatic spray gun. The electrostatic spray gun transfers pile fibers 29a to an interior charge compartment under a predetermined air pressure, and after the pile fibers 29a which have been so transferred are electrostatically charged, the electrostatic spray gun sprays out the pile fibers 29a which have been so electrostatically charged from an outlet thereof to the location where the adhesive is applied. In addition, the adhesive is thermally set in the dryer 40, and after the pile fibers 29a are fixed to the adhesive layer 28 so that the fibers cannot be dislodged therefrom, extra pile fibers 29a are blown off at the blower 41. The flocked portion 29 is completed after these steps have been completed. In a designed surface D corresponding to a corner portion of the trim portion 5 where a bending process is applied, flocking is applied more densely than other locations, so that the flocked portion 29 can be formed over the whole area of the designed surface D with a substantially uniform density after the completion of the weather strip 4.

A bending process is applied to the intermediate extruded material 32 which has been so flocked by a bending machine 42, so that a trim portion 5 is formed which has a substantially U-shaped cross section. Thereafter, the intermediate extruded material 32 is cut to a predetermined dimension by a cutter 43, so that a weather strip 4 is obtained.

Note that a bending process using the bending machine 42 may be carried out after the vulcanizing step but before the adhesive application step. In this case, a damage imposed on a flocked surface by a roller of the bending machine 42 can be prevented. Furthermore, the insert 14 may be pre-formed into an upwardly converging sectional shape of or into an angled shape for supply to the rubber extruder 31 so as to ease the bending process and covering by rubber.

In addition, while the manufacturing method described above is used to manufacture weather strips in a continuous manufacturing line, the weather strip may be manufactured in such way that a long vulcanized weather strip material is manufactured in a manufacturing line and thereafter, a flocking process is carried out on the long weather strip material in another manufacturing line.

As has been described in detail, in this embodiment, the flocked portion 29 is formed on the designed surface D of the weather strip 4 such as the external surface of the designed lip 18 via the adhesive layer 28 by spraying the pile fibers 29a by the electrostatic spray gun, whereby the pile fibers 29a are bonded to the adhesive layer 29 at one end thereof while each being angled randomly with respect to the normal direction to the designed surface D. Consequently, irregularities are caused to appear on the flocked portion 29 by the pile fibers 29a which are each planted so as to be directed variously, thereby making it possible to represent a natural feeling. As a result, an increase in external appearance quality at the flocked portion 29 can be realized.

In addition, in this embodiment, since the designed surface D is covered with the pile fibers 29a which are each angled randomly with respect to the normal direction to the designed surface D, being different from the related art in which the pile fibers are planted substantially vertically to the substrate, when the designed surface D is seen from the normal direction thereto, the effect to conceal the color of the substrate is increased.

Moreover, since the pile fibers 29a are colored in beige, along with the fact that the pile fibers 29a are each angled randomly with respect to the normal direction as has been described above, the effect to conceal the color of the substrate is made explicit, and a defect that the color of the colored pile fibers is reduced or offset is suppressed by the sufficient concealment of the color of the substrate. Furthermore, since the adhesive layer 28 is also colored in the same color as that of the flocked portion 29, this configuration also contributes to the concealment of the color of the substrate. As a result, the increase in external appearance quality can also be realized from the viewpoint of tinge.

Second Embodiment

Figure 6:
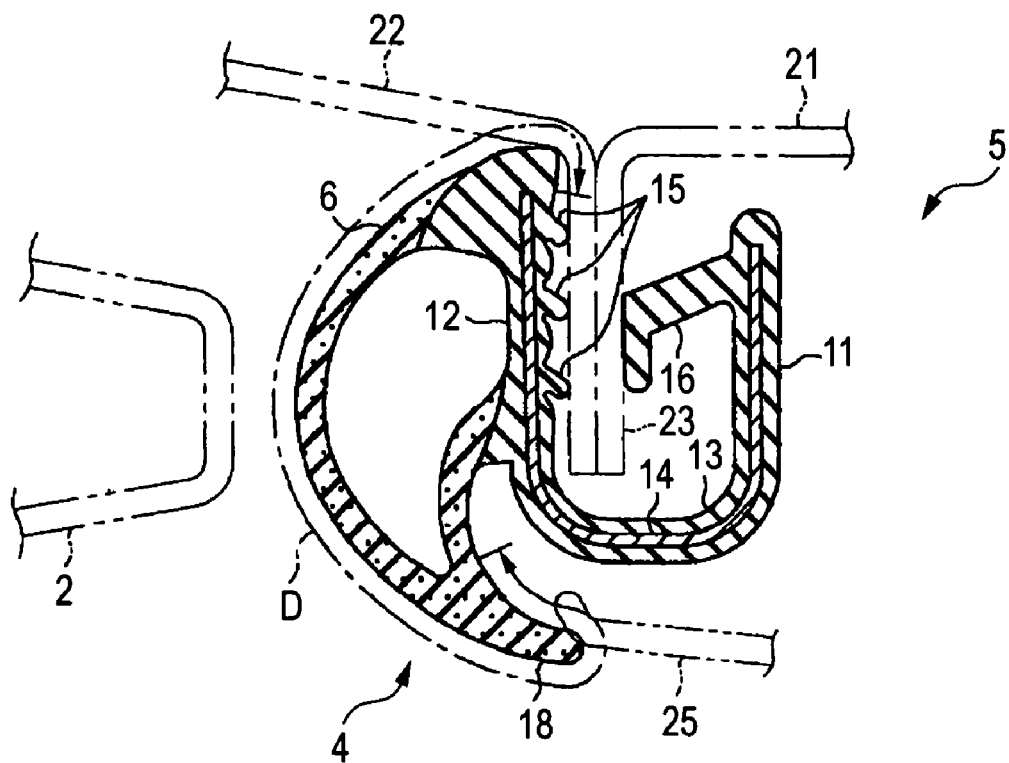
FIG. 6 is a sectional view showing the weather strip according to second and third embodiments of the invention.

The weather strip 4 according to the second embodiment is shown in FIG. 6. Note that like reference numerals will be imparted to like constituent portions to those of the first embodiment, and the description thereof will be omitted.

As shown in FIG. 6, a portion of an external surface of the seal portion 6 which ranges from a root portion of the seal portion 6 which faces an outer circumference of the door opening 3 to a distal end portion of the lip portion 18 becomes visible such that the weather strip 4 is mounted accordingly. Due to this, as is seen from a partially enlarged sectional view of FIG. 4, a flocked portion 29 is formed over a predetermined area D which includes the external surface of the seal portion 6 via an adhesive layer 28.

Similarly to the first embodiment, as an adhesive which provides the adhesive layer 28, an adhesive which is based on a water-based urethane resin is used in the second embodiment.

Here, Table 1 shows the results of an evaluation of various types of adhesives which was carried out in selection of the adhesive which is based on the water-based urethane resin as the adhesive which provides the adhesive layer 28. Table 1 shows the results of an evaluation of styrene-modified acrylic resin-based adhesive, acrylic copolymer resin-based adhesive, urethane resin-based adhesive and an adhesive made by adding a carbodiimide hardening agent or an epoxy hardening agent to a urethane resin.

TABLE 1

| Adhesives | Extensibility | Wear Resistance | Environment Adaptability | Total evaluation |
|---|---|---|---|---|
| Styrene-modified acrylic resin-based adhesive | 50% or less | X | ○ | X |
| Acrylic copolymer resin-based adhesive | 100% or more | X | X | X |

TABLE 1-continued

| Adhesives | Extensibility | Wear Resistance | Environment Adaptability | Total evaluation |
|---|---|---|---|---|
| Urethane resin-based adhesive | 100% or more | ◯ | ◯ | ◯ |
| Urethane-based adhesive + carbodiimide hardening agent | 100% or more | ◎ | ◯ | ◎ |
| Urethane-based adhesive + epoxy hardening agent | 100% or more | ◎ | ◯ | ◎ |

The adhesive that is applied to the seal portion 6 should be at least such that it can follow the deformation of the seal portion 6, is superior in durability and is friendly to the environment. Due to this, (1) the extensibility of adhesive, (2) wear resistance of the seal portion 6 to which adhesive is applied and (3) environment adaptability of adhesive were studied this time.

In studying the extensibility, in compliance with a testing method (JIS K6251) of JIS (Japanese Industrial Standards), the adhesives were made into films and were stamped out from the films into a dumb-bell shape, and tensile tests were carried out using the dumb-bell shaped test specimens for study of extensibility at normal temperatures. In addition, in studying wear resistance, a predetermined wear test was carried out in which the surface of the seal portion 6 was rubbed such that each adhesive was applied to the seal portion 6, and the degree of wear of the surface was studied. In studying environment adaptability, the presence of emission of volatile organic compound such as formaldehyde was studied.

As is seen from the evaluation results shown in Table 1, since the styrene-modified acrylic resin-based adhesive exhibits an extensibility of 50% or less and is generally used to a hard portion, the adhesive is not suitable for application to the seal portion 6. In case this adhesive is applied to the seal portion 6, since the surface of the seal portion 6 gets hard, a proper deformation of the seal portion 6 becomes difficult, leading to a risk that a reduction in sealing properties maybe called for. On the contrary to this, the other adhesives exhibit an extensibility of 100% or more, and hence, the problem inherent in the styrene-modified acrylic resin-based adhesive is made difficult to occur.

In addition, as to wear resistance, since the styrene-modified acrylic resin-based adhesive and the acrylic copolymer resin-based adhesive exhibited a large degree of wear and could not meet a predetermined standard, they were evaluated as being not good (X). In contrast to this, any of the urethane resin-based adhesives could meet the standard and were evaluated as being good (◯). Among them, the adhesives to which the carbodiimide hardening agent and the epoxy hardening agent were added exhibited a small degree of wear and were evaluated as being best (◎).

In addition, since the acrylic copolymer resin-based adhesive produces formaldehyde, the adhesive was evaluated as being not good (X) with respect to the environment adaptability. In contrast to this, since any of the other adhesives are based on water, they emit no volatile organic compound and were evaluated as being good (◯).

Judging generally from the evaluation results, the adhesives which were based on water-based urethane resins were selected. Among them, when wear resistance is taken in consideration, the adhesive to which the carbodiimide hardening agent or the epoxy hardening agent is added is suitable for use on the external surface of the seal portion 6.

Now then, the flocked portion 29 will be described in detail. The flocked portion 29 according to this embodiment is formed by spraying a multiplicity of pile fibers 29*a* to the adhesive layer 28 using a pressurized spray gun (pressurized flocking), whereby a state results in which the individual pile fibers 29*a* are bonded to the adhesive layer 28 at one end thereof while lying to be angled (lying angle) randomly with respect to the surface of the seal portion 6. As the pile fibers 29*a*, for example, a crimped and bent type polyamide fiber is used which has a length of 1.0 mm and a thickness of 3.3 T dtex. Furthermore, the pile fibers 29*a* are colored in beige which is a similar color to that of the adhesive layer 28. A color in which the pile fibers 29*a* are colored is not, of course, limited to beige, but the fibers maybe colored in any color which matches the interior component 25, as with the adhesive layer 28. By adapting the configuration that has been described above, since some of the multiplicity of pile fibers 29*a* get entangled with each other and are sprayed to lie obliquely with respect to the surface of the seal portion 6, the flocked portion 29 is allowed to have a texture which is more approximate to a fabric (or to exhibit a fabric-like appearance).

In the following flocking step, firstly, in a flocking apparatus 39, a multiplicity of pile fibers 29*a* are sprayed to the portion where the adhesive is applied using a pressurized spray gun. The pressurized spray gun sends the pile fibers 29*a* as deep as an interior portion of a fiber application booth under a predetermined air pressure and to spray the pile fibers 29*a* out from an outlet to the portion where the adhesive is applied under a predetermined air pressure. As this occurs, the pile fibers 29*a* which are so sprayed are caused to lie on the adhesive layer 28 while being oriented in various directions. Then, the adhesive so applied is heated to be set in a dryer 40 so that the pile fibers 29*a* are fixed in place in such a manner as not to be dislodged therefrom. Thereafter, extra pile fibers 29*a* are blown off from the adhesive layer 28 in a blower 41. The flocked portion 29 is completed after passing through the steps that have been described above.

As has been described in detail, by forming the flocked portion 29 on the external surface of the seal portion 6, the fabric-like external appearance can be obtained, and a high design property can be acquired for the seal portion 6. In addition, being different from a case where an actual fabric is attached to the external surface of the seal portion 6, since no wrinkle is produced in a corner portion or the like when the weather strip 4 is mounted, a reduction in external appearance quality is suppressed. Furthermore, since the seal portion 6 can be deformed without difficulty when the door 2 is closed, a reduction in sealing properties is also suppressed. As a result, an increase in the external appearance quality of the weather strip can be realized while maintaining the sealing properties of the seal portion 6.

In addition, in this embodiment, the adhesive based on the water-based urethane resin and having the extensibility of 100% or more after it has set is used as the adhesive which provides the adhesive layer 28. Due to this, the adhesive can follow the deformation of the seal portion 6 which occurs as the door 2 is opened and closed, whereby not only the reduction in sealing properties can be suppressed but also the sprayed pile fibers 29*a* come off in no case.

Additionally, since not only the bent type pile fibers 29*a* is adapted as the pile fibers 29*a* which provide the flocked portion 29 but also the individual sprayed pile fibers 29*a* are allowed to lie in random directions with respect to the surface of the seal portion 6, compared to the case where the straight pile fibers are sprayed to lie vertical on the surface of the seal portion 6, the effect to conceal the surface of the seal portion 6 can be enhanced, and the color (black) of the substrate of the seal portion 6 which results from carbon black contained therein can also be concealed.

The adhesive layer 28 and the pile fibers 29a are colored. Therefore, a color tinge that is similar to the fabric can be obtained and can be conceal the base color (black) of the seal portion 6 by the carbon black.

The range where the flocked portion 29 is formed is not limited to the range D described in the embodiment, and hence, the flocked portion 29 only has to be formed on at least the external surface of the seal portion 6. In addition, in a case where the trim portion 5 and the like constitute a designed surface which becomes visible as the external appearance, flocking may be applied to the designed surface.

Third Embodiment

When a fabric is attached to a weather strip, there is a fear that wrinkles are produced in a portion such as a seal portion of the weather strip which is deformed.

Figure 7:
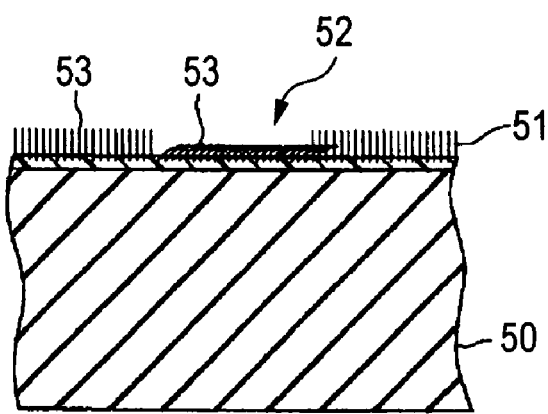
FIG. 7 is a partially enlarged sectional view which explains the collapse of pile fibers.

However, since the seal portion is brought into press contact with the circumferential portion of the door opening when the door is closed, in the event that a flocked portion 51 is formed on an external surface of a seal portion 50 as shown in FIG. 7, a state results in which pile fibers 53 are collapsed which lie on a sealing surface 52 or a portion on the seal portion 50 which is brought into contact with the circumferential portion of the door opening or the like. The pile fibers 53 which are collapsed in this way when the door is closed are held in the collapsed state for some time even after the door is opened, and due to this, a contact mark remains at the portion which has constituted the sealing surface 52. Since this contact mark (the sealing surface 52) looks shining brighter due to light being reflected by the collapsed pile fibers 53 than the other portions of the flocked portion 51 so as to become explicit, there may be caused as a result a risk that a reduction in external appearance quality is called for.

The weather strip 4 according to the third embodiment will be described with reference to FIG. 6. Note that like reference numerals will be imparted to like constituent portions to those of the first and second embodiments, and the description thereof will be omitted. The flocked portion 29 will be described in detail. The flocked portion 29 according to this embodiment is formed by spraying a multiplicity of pile fibers 29a to the adhesive layer 28 using a pressurized spray gun (pressurized flocking), whereby a state results in which the individual pile fibers 29a are bonded to the adhesive layer 28 at one end thereof while lying to be angled (lying angle) randomly with respect to the surface of the seal portion 6.

As to type, length and thickness of the pile fibers 29a which provide the flocked portion 29, for example, a crimped and bent type polyamide fiber is used which has a length of 0.8 mm and a thickness of 3.3 T dtex. By adapting such a fiber, since some of the multiplicity of pile fibers 29a get entangled with each other and are sprayed to lie obliquely with respect to the surface of the seal portion 6, the flocked portion 29 is allowed to have a texture which is more approximate to a fabric (or to exhibit a fabric-like appearance).

In addition, as to color of the multiplicity of pile fibers 29a, pile fibers of two different colors, white and black, are used, whereby the flocked portion 29 is colored in gray (a mixed color of while and black) which is the color in which the interior component 25 and the adhesive layer are colored. The mixed color is not limited to gray but may be any color which matches the color of the interior component 25, as with the adhesive layer 28.

As has been described in detail heretofore, by forming the flocked portion 29 on the external surface of the seal portion 6, a fabric-like external appearance can be obtained, and a high design property can be acquired for the seal portion 6. Furthermore, by using the aforesaid pile fibers which are relatively shorter and relatively thicker than the conventional pile fibers as pile fibers which provide the flocked portion 29, the pile fibers 29a are made difficult to be collapsed even when the seal portion 6 is brought into press contact with the circumferential portion of the door opening as the door 2 is closed, and the collapsed pile fibers 29a are made easy to be restored to their original state as the door 2 is opened. As a result, the contact mark is made difficult to remain at the portion which has constituted the sealing surface when the door 2 is opened. Moreover, the reduction in external appearance quality can be suppressed which would otherwise be caused due to the contact mark being made to look shining brighter than the other portions by light reflected by the collapsed pile fibers 29a.

In addition, the bent type pile fiber is adapted as the pile fibers 29a which provide the flocked portion 29, and the pile fibers 29a are sprayed to lie on the surface of the seal portion 6 in random directions with respect to the seal portion surface. Furthermore, the multiplicity of pile fibers 29a are provided with the pile fibers of two different colors, white and black, so that the flocked portion 29 is colored in gray (the mixed color of white and black) as a whole. Due to this, even in case a contact mark is produced on the seal portion 6, whereby the collapsed pile fibers 29a reflect light, a difference between the contact mark and the other portions is made difficult to be visible and the contact mark is made difficult to be explicit. As a result, the reduction in external appearance quality can be suppressed, compared to the case where the pile fibers which are formed into a straight shape are sprayed to lie vertically on the surface of the seal portion 6.

While in the embodiment, the crimped and bent type polyamide fiber which has the length of 0.8 mm and the thickness of 3.3 T dtex is used as the pile fibers 29a which provide the flocked portion 29, the configuration of the pile fiber 29a is not limited thereto. For example, a pile fiber made from polyethylene may be adapted, or a pile fiber which is formed into a straight shape may be adapted. However, in order to make the contact mark produced when the door 2 is closed invisible, it is preferable to use a pile fiber having a length of 0.6 mm or longer and 1.0 mm or shorter and a thickness of 2.2 T or thicker and 6.7 T or thinner. In order to make the contact mark more invisible, it is more preferable to use a pile fiber 29a having a length of 0.6 mm or longer and 0.8 mm or shorter and a thickness of 3.3 T or thinner.

Note that the bent type pile fiber is designated as a curled type pile fiber. In addition, as to the length of the pile fiber, in the event that a pile fiber having a length of 1.0 mm or longer is used, the pile fibers situated on the contact portion become easy to lie as when collapsed, when the door 2 is closed, and the contact mark becomes explicit. To cope with this, although it is considered to increase the thickness of the pile fiber to enhance the rigidity thereof, so as to increase the restoring force of the pile fiber itself, in the event that a longer and thicker pile fiber is used, pile fibers get entangled with each other in advance, and the nozzle is clogged with the entangled pile fibers, thereby a pressurized spraying application of pile fibers being disabled. Consequently, ranges of length and thickness of pile fibers which make the contact mark invisible and enables a uniform flocking will result in those described above.

The pile fibers 29a in the embodiment are provided with the pile fibers of two different colors, white and black, and hence, the flocked portion 29 is colored in gray which is the mixed color of white and black. The color of the pile fiber 29a is not limited thereto. For example, pile fibers of three or more colors may be combined for use, or a transparent (clear) pile fiber may be added thereto. However, in order to make the contact mark produced when the door 2 is closed invisible, at least while is preferably included therein.

Note that the invention is not limited to the contents of the embodiments that have been described heretofore and hence may be carried out in the following manners. Of course, other application examples and modified examples can be adapted which will not be illustrated below.

(a) While the embodiments are described as the invention being applied to the weather strip 4 which is provided on the circumferential portion of the door opening 3 in the vehicle body corresponding to the (front side) door 2, the invention can be applied to a weather strip which is provided on a peripheral portion of the door 2, peripheral portions of other doors including a rear side door, a back door, a luggage compartment door (a trunk lid), a roof door (a sliding roof panel) or circumferential portions of door openings which correspond to those doors.

(b) In a weather strip in which a designed lip 18 is omitted and the external surface of a trim portion 5 is made to constitute a designed surface, a configuration may be adapted in which a flocked portion 29 is formed on the external surface of the trim portion 5. In addition, in place of the sponge rubber, a configuration may be adapted in which the seal portion 6 is formed of a solid rubber.

(c) While the embodiment is illustrated as the EPDM rubber is used as the material which forms the main body portion of the weather strip 4, other rubber materials such as IR (isoprene rubber), CR (chloroprene rubber) and the like may be used.

(d) While in the embodiment, the adhesive based on the water-based urethane resin is used as the adhesive which provides the adhesive layer 28, other types of adhesives may be used which include acryl-based, vinyl acetate-based, EVA-based, PVA-based, epoxy-based, silicone-based and phenol-based adhesives. However, the adhesive used preferably has the extensibility of 100% or more in consideration of the following properties to the deformation of the seal portion 6 and emits no volatile organic compound (VOC) in consideration of friendliness to the environment. In addition, in consideration of wear resistance, among adhesives which are based on water-based urethane resins, an adhesive may be adapted which contains a carbodiimide hardening agent or an epoxy hardening agent which is added thereto. In addition, the invention is not limited to the embodiment with respect to the color of the adhesive, and hence, for example, a transparent (clear) adhesive may be adapted.

(e) While in the embodiments, the weather strip 4 is mounted along the entire periphery of the circumferential portion of the door opening 3, the weather strip 4 does not necessarily have to be mounted along the entire periphery of the part. For example, the weather strip may be mounted partially along the circumferential portion. In addition, the weather strip may include partially a molded portion.

(f) While in the embodiments, the polyamide fibers are used as the pile fibers 29a which provide the flocked portion 29, the invention is not limited thereto, and hence, polyethylene fibers may be adapted. The length and the like of the pile fibers 29a are not, of course, limited to those described in the embodiment. For example, in place of the pile fibers 29a which are straight, pile fibers which are bent may be adapted. Also, as to the color of the pile fibers, the invention is not limited to the color described in the embodiments, and hence, transparent (clear) pile fibers or colored pile fibers which are colored to match the color of an interior component may be adapted.

(g) While in the embodiment, the crimped and bent type polyamide fiber which has the length of 1.0 mm and the thickness of 3.3 T dtex is used as the pile fibers 29a which provide the flocked portion 29, the configuration of the pile fiber 29a is not limited thereto. For example, a pile fiber made from polyethylene may be adapted, or a pile fiber which is formed into a straight shape may be adapted. Of course, the invention is not limited to what has been described in the embodiment with respect to the length and color of the pile fibers, and hence, for example, a transparent (clear) pile fiber may be adapted. Note that the bent type pile fiber is designated as a curled type pile fiber. In addition, as to the length of the pile fiber, a length of about 3 mm constitutes an upper limit, and in case a pile fiber which is longer than that, pile fibers get entangled beforehand and the nozzle is clogged therewith, disabling the pressurized spray application. Furthermore, in a case where an electrostatic spray gun, which will be described later on, is used, since pile fibers are easy to get entangled with each other due to the effect of static electricity, only pile fibers having a length of the order of 0.6 to 0.8 mm can be used.

(h) While in the embodiment, the flocked portion 29 is formed by spraying the multiplicity of pile fibers 29a to the adhesive layer using the pressurized spray gun (pressurized flocking), the spraying method is not limited thereto, and other spraying methods may be adapted which includes a method using an electrostatic spray gun.

What is claimed is:

1. A weather strip comprising:
a trim portion comprising a U-shaped cross section adapted to be mounted on a flange along a circumferential portion of a door opening of a vehicle body;
a hollow seal portion protruded from the trim portion so as to be brought into contact with a vehicle door and deformed when the vehicle door is closed; and
a flocked portion adhered with an adhesive layer which comprises an adhesive comprising a water-based urethane on at least a predetermined area of an external surface of the hollow seal portion and comprising a plurality of pile fibers bonded to the adhesive layer to form a plurality of the piles so as to be angled randomly with respect to a direction normal to the external surface of the hollow seal portion,
wherein the hollow seal portion comprises a lip portion which covers an end portion of an interior component,
wherein the adhesive for adhesion of the pile fibers comprises an extensibility of 100% or greater after setting, and
wherein the adhesive comprising the water-based urethane further comprises a carbodiimide hardening agent or an epoxy hardening agent.

2. A weather strip according to claim 1, wherein the plurality of pile fibers comprise pile fibers of two or more different colors including at least white.

3. A weather strip according to claim 1, wherein the adhesive layer is colored when formed.

4. A weather strip according to claim 1, wherein the flocked portion comprises a plurality of colored pile fibers.

5. A weather strip according to claim 1, wherein the pile fibers are bent into a curve.

6. A weather strip according to claim 1, wherein the hollow seal portion comprises an elastic sponge material.

7. A weather strip according to claim 1, wherein the plurality of pile fibers comprise a length within a range of 0.6 mm to 1.0 mm and a thickness within a range to provide a value of 2.2 dtex to 6.7 dtex and are disposed on at least an external surface of the seal portion.

8. A weather strip according to claim 1, wherein the plurality of pile fibers comprise a curved shape.

9. A weather strip according to claim 1, wherein at least a portion of the plurality of pile fibers comprise a curved shape.

10. A weather strip according to claim 1, wherein the plurality of pile fibers lie obliquely with respect to a curved surface of the hollow seal portion.

11. A weather strip according to claim 1, wherein the adhesive comprising the water-based urethane further comprises the carbodiimide hardening agent.

* * * * *